US008255147B2

(12) United States Patent
Roberts et al.

(10) Patent No.: US 8,255,147 B2
(45) Date of Patent: Aug. 28, 2012

(54) AIR TRAFFIC CONTROL

(75) Inventors: Alison Laura Udal Roberts, London (GB); Stephen James Pember, London (GB)

(73) Assignee: Nats (En Route) Public Limited Company, London (GB)

( * ) Notice: Subject to any disclaimer, the term of this patent is extended or adjusted under 35 U.S.C. 154(b) by 575 days.

(21) Appl. No.: 12/158,964

(22) PCT Filed: Dec. 21, 2006

(86) PCT No.: PCT/GB2006/004873

§ 371 (c)(1),
(2), (4) Date: Jun. 23, 2008

(87) PCT Pub. No.: WO2007/072028

PCT Pub. Date: Jun. 28, 2007

(65) Prior Publication Data

US 2009/0012660 A1 Jan. 8, 2009

(30) Foreign Application Priority Data

Dec. 23, 2005 (GB) .................................. 0526432.0

(51) Int. Cl.
*G06F 19/00* (2006.01)

(52) U.S. Cl. ....................................................... 701/120

(58) Field of Classification Search .................. 701/3–4, 701/120, 122, 300–301; 340/945, 990; 342/29, 342/36–38

See application file for complete search history.

(56) References Cited

U.S. PATENT DOCUMENTS

| | | | |
|---|---|---|---|
| 4,949,267 A | 8/1990 | Gerstenfeld et al. | |
| 5,714,948 A | 2/1998 | Farmakis et al. | |
| 6,393,358 B1 | 5/2002 | Erzberger et al. | |
| 6,604,044 B1 | 8/2003 | Kirk | |
| 6,785,594 B1 | 8/2004 | Bateman et al. | |
| 2003/0200024 A1 | 10/2003 | Poreda | |
| 2005/0035898 A1 * | 2/2005 | Shiomi et al. | 342/36 |
| 2007/0032940 A1 | 2/2007 | Villiers | |

FOREIGN PATENT DOCUMENTS

| | | | |
|---|---|---|---|
| EP | 0380460 | A2 | 8/1990 |
| EP | 0598154 | A1 | 5/1994 |
| EP | 1450331 | A1 | 8/2004 |
| FR | 2854978 | A1 | 11/2004 |
| WO | WO8801086 | A2 | 2/1988 |

(Continued)

OTHER PUBLICATIONS

International Search Report and Written Opinion from GB2006/004850.

(Continued)

*Primary Examiner* — Kim T Nguyen

(74) *Attorney, Agent, or Firm* — Procopio, Cory, Hargreaves & Savitch LLP

(57) ABSTRACT

An air traffic control system includes a trajectory prediction module for calculating a trajectory for each aircraft, for inputting aircraft detected position data, and for recalculating the trajectories based on said position data, and a conflict detector for detecting, based on the trajectories, future circumstances under which pairs of aircraft violate predetermined proximity tests, and for causing a display on the display device indicating said circumstances. The systems uses a first proximity test and a second, more restrictive, proximity test; and displays a symbol representing pairs of aircraft which violate the second test in a first mode, and those which violate the first set but not the second set in a second mode.

12 Claims, 13 Drawing Sheets

FOREIGN PATENT DOCUMENTS

| | | | |
|---|---|---|---|
| WO | WO03067545 | A1 | 8/2003 |
| WO | WO2004102505 | A2 | 11/2007 |

OTHER PUBLICATIONS

P. Whysall: Future Area Control Tools Support (FACTS), 2nd USA/Europe Air Traffic Management R&D Seminar, Dec. 1998, pp. 1-10, XP002423982, Orlando, FL.

A. Price: Future Area Control Tools Support Operational Concept and Development Status, FAA/EURO Control AP6 TIM, Oct. 1999, pp. 109, XP002423983, Memphis, USA.

International Search Report and Written Opinion for PCT/GB2006/004873.

ATC Training: NATS Looks to the Future, article published sometime before Nov. 10, 2005, available at the following URL: http://www.airport-int.com/categories/atc-training/atc-training-nats-looks-to-future.asp.

Search Report from GB0526432.0 dated Apr. 20, 2007.

Search Report from GB0526433.8 dated Apr. 20, 2007.

International Search Report and Written Opinion from PCT/GB2007/002459 issued Sep. 20, 2007.

International Search Report and Written Opinion from PCT/GB2007/002449 issued Sep. 20, 2007.

Civil Aviation Authority. Manual of Air Traffic Services Part 1 (Cover and bibliographic data in 3 pages; Glossary pp. 5-6, 13; Section 1, Chapter 6 pp. 1-4). Jul. 2, 2009.

* cited by examiner

AIR TRAFFIC CONTROL

CROSS-REFERENCE TO RELATED APPLICATION

This application is the U.S. national stage application of international application serial number PCT/GB2006/004873, filed 21 Dec. 2006, which claims priority to British Patent Application No. 0526432.0, filed 23 Dec. 2005, each of which is incorporated herein by reference in its entirety.

FIELD OF THE INVENTION

This invention relates to computerised systems for aiding air traffic control.

BACKGROUND OF THE INVENTION

Air traffic control involves human staff communicating with the pilots of a plurality of planes, instructing them on routes so as to avoid collisions. Aircraft generally file "flight plans" indicating their routes before flying, and from these, the controllers have some initial information on the likely presence of aircraft, but flight plans are inherently subject to variation (due, for example, to delays in take offs; changes of speed due to head wind or tails wind; and permitted modifications of the course by the pilot). In busy sectors (typically, those close to airports) active control of the aircraft by the controllers is necessary.

SUMMARY OF THE INVENTION

The controllers are supplied with data on the position of the aircraft (from radar units) and ask for information such as altitude, heading and speed. They instruct the pilots by radio to maintain their headings, alter their headings, in a predetermined fashion, or maintain or alter their altitudes (for example to climb to a certain altitude or to descend to a certain altitude) so as to maintain safe minimum separation between aircraft and, thus, to avoid the risk of collisions. Collisions are extremely rare, even in the busiest areas, due to the continual monitoring and control of aircraft by the air traffic controllers, for whom safety is, necessarily, the most important criterion.

On the other hand, with continual growth of air transportation, due to increasing globalised trade, it is important to maximise the throughput of aircraft (to the extent that this is compatible with safety). Further increasing throughput with existing air traffic control systems is increasingly difficult. It is difficult for air traffic controllers to monitor the positions and headings of too many aircraft at one time on conventional equipment, and human controllers necessarily err on the side of caution in separately aircraft.

The paper "future area control tools support" (FACTS), Peter Whysall, Second USA/Europe Air Traffic Management RND Seminar, Orlando, 1-4 Dec. 1998 (available online at the following URL) http://atm-seminar-98.eurocontrol.fr/finalpapers/track1/whysall.pdf discloses a tool for planning and tactical controllers in which interactions between pairs of aircraft are classified as "acceptable", "uncertain" or "unacceptable". In the case of interactions between aircraft which are classified as "acceptable", it is clear that the controller needs to do nothing, and in the case of aircraft which are classified as "unacceptable" it is clear that he needs to do something. However, aircraft which are classified as "uncertain" merely set a puzzle for the controller. The more generous the approach to modelling uncertainty, the more aircraft interactions fall into this third category.

The same is true of the paper "Future Air Control Tools Support Operation Concept and Development Status", Andy Price, FAA/Euro Control AP6 TIM-Memphis USA 19-21 Oct. 1999, which additionally shows the display of each of these three classes of interaction in a different colour (red for unacceptable, green for acceptable and yellow for uncertain), available at the following URL:

http://www.eurocontrol.int/moc-faa-euro/gallery/content/public/papers/TIMS/AP6/tims/tim-memphis/FACTS/facts.ppt An aim of the present invention is therefore to provide computerised support systems for air traffic control which allow human operators to increase the throughput of aircraft without an increase in the risk of losses of minimum permitted separation from its present very low level. The invention in various aspects is defined in the claims appended hereto, with advantages and preferred features which will be apparent from the following description and drawings.

BRIEF DESCRIPTION OF THE DRAWINGS

Embodiments of the invention will now be illustrated, by way of example only, with reference to the accompanying drawings in which.

GENERAL DESCRIPTION OF AIR TRAFFIC CONTROL SYSTEM

Figure 1:
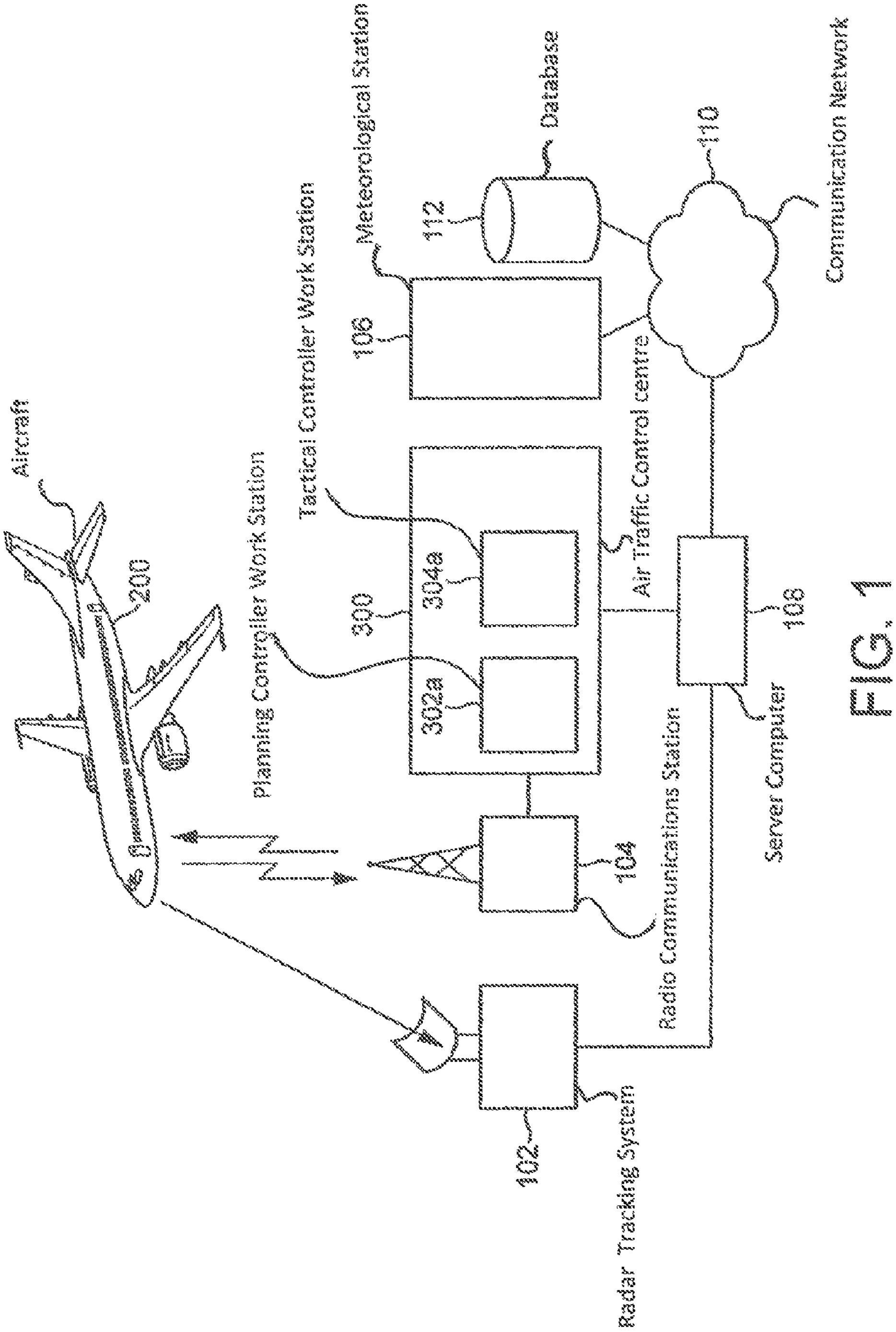
FIG. 1 is a block diagram shown an air traffic control system for a sector of airspace in accordance with an embodiment of the invention.

FIG. 1 shows the hardware elements of an air traffic control system (known per se, and used in the present embodiments). In FIG. 1, a radar tracking system, denoted 102, comprises a radar unit for tracking incoming aircraft, detecting bearing and range (primary radar) and altitude (secondary radar), and generating output signals indicating the position of each, at periodic intervals. A radio communications station 104 is provided for voice communications with the cockpit radio of each aircraft 200. A meteorological station 106 is provided for collecting meteorological data and outputting measurements and forecasts of wind, speed and direction, and other meteorological information. A server computer 108 communicating with a communication network 110 collects data from the radar system 102 and (via the network 110) the meteorological station 106, and provides the collected data to an air traffic control centre 300. Data from the air traffic control centre 300 is, likewise, returned to the server computer for distribution through the network 110 to air traffic control systems in other areas.

A database 112 stores information on each of a plurality of aircraft 200, including the aircraft type, and various performance data such as the minimum and maximum weight, speed, and maximum rate of climb.

The airspace for which the air traffic control centre 300 is responsible is typically divided into a plurality of sectors each with defined geographical and vertical limits and controlled by planning and tactical controllers.

The air traffic control centre 300 comprises a plurality of work stations 302*a*, 302*b*, . . . for planning controllers, and a plurality of work stations 304*a*, 204*b*, . . . for tactical controllers. The role of the planning controllers is to decide whether or not to accept an aircraft flight in the volume of air space controlled by the air traffic control centre 300. The controller receives flight plan data regarding the aircraft, and information from a neighbouring volume of air space, and, if the flight is accepted, provide an entry altitude for the aircraft entering the sector, an exit altitude for an aircraft exiting the sector, and a trajectory between an entry point and an exit point of the sector. If the planning controller finds that the sector is likely to be too crowded to accept the flight, he declines the flight, which must then make alternative route plans.

The planning controller therefore considers only the intended flight plans of the aircraft, and the general level of businesses of the sector and anticipated positions of other aircraft, and sets only an outline trajectory through the sector for each aircraft. The present invention is chiefly concerned with the actions of the tactical controller, which will be discussed in greater detail below.

Figure 2:
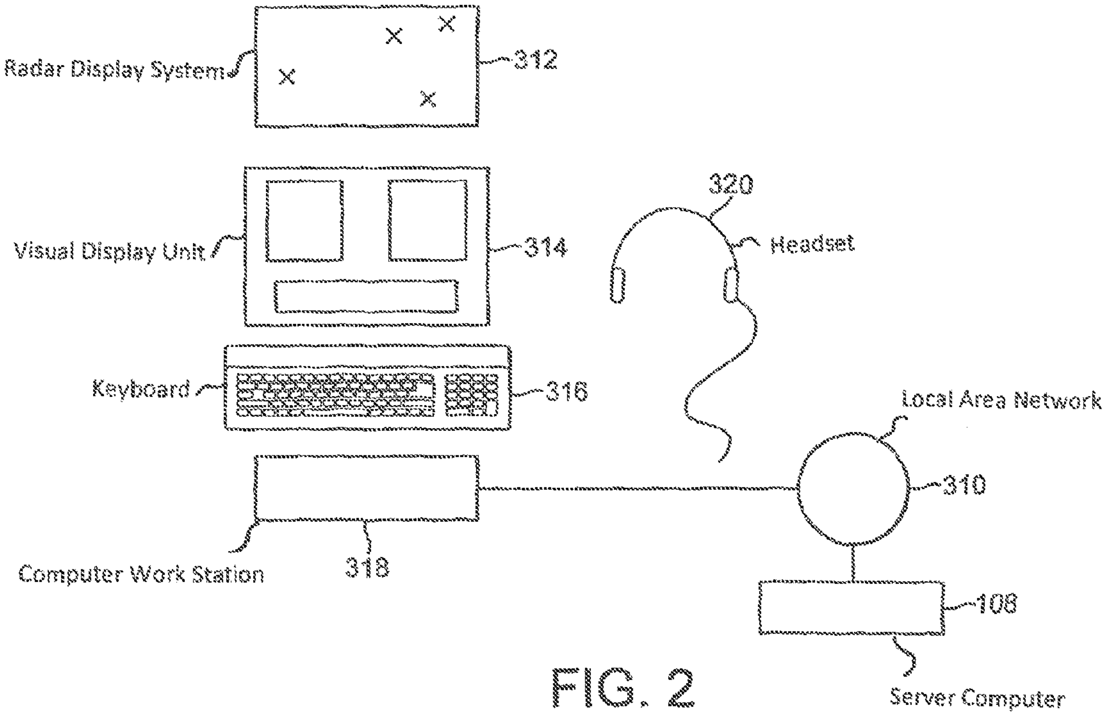
FIG. 2 is a block diagram showing the elements of a tactical air traffic controllers workstation forming part of FIG. 1.

Referring to FIG. 2, each work station 304 for a tactical controller comprises a radar display screen 312 which shows a conventional radar view of the air sector, with the sector boundaries, the outline of geographical features such as coastline, the position and surrounding airspace of any airfields (all as a static display), and a dynamic display of the position of each aircraft received from the radar system 102, together with an alphanumeric indicator of the flight number of the that aircraft. The tactical controller is therefore aware, at any moment, of the three dimensional position (level, and latitude and longitude or X/Y co-ordinates) of the aircraft in the sector. A headset 320 comprising an ear piece and microphone is connected with the radio station 104 to allow the controller to communicate with each aircraft 200.

A visual display unit 314 is also provided, on which a computer workstation 318 can cause the display of one or more of a plurality of different display formats, under control of the controller operating the keyboard 316 (which is a standard QWERTY keyboard). A local area network 308 interconnects all the workstation computer 318 with the server computer 108. The server computer distributes data to the terminal workstation computers 318, and accepts data from them entered via the keyboard 316.

Software Present on Server

Figure 3:
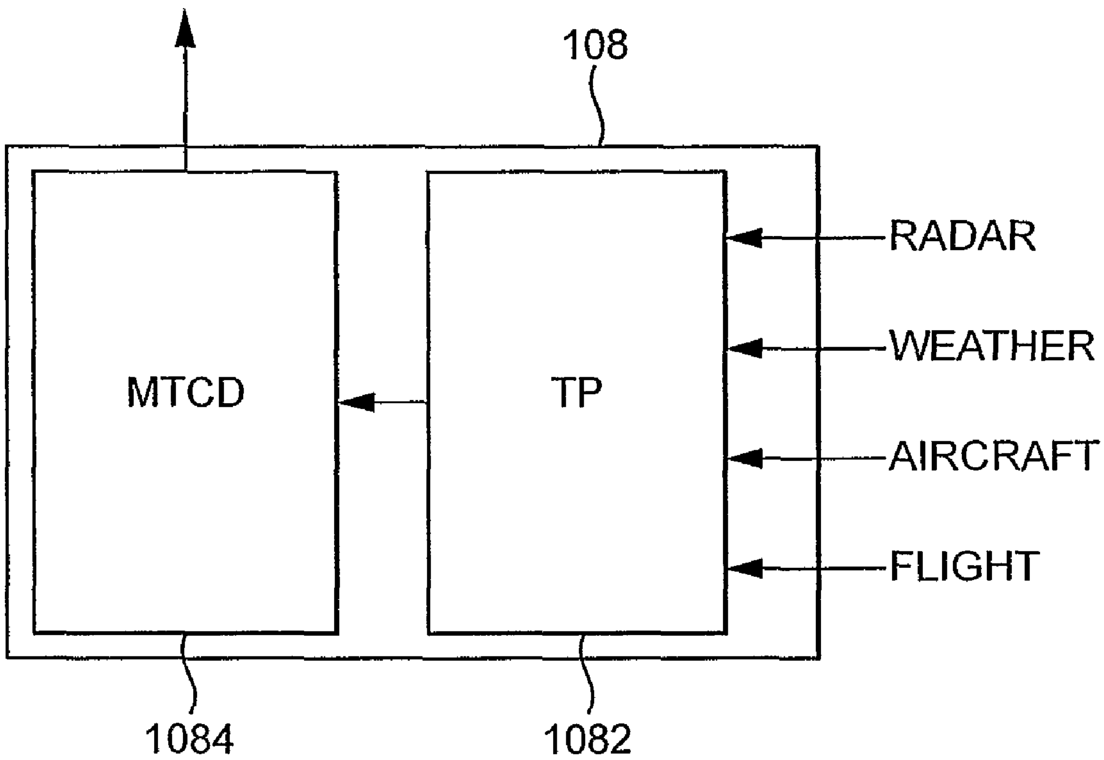
FIG. 3 is a diagram showing the software present in a host computer making up part of FIG. 1.

Referring to FIG. 3, the principal software executing on the server 108 is indicated. It consists of a trajectory prediction (TP) program 1082 and a medium term conflict detection (MTCD) program 1084.

Trajectory Predictor 1082

The trajectory prediction program 1082 is arranged to receive data and calculate, for each aircraft, a trajectory through the airspace sector controlled by the controllers. The trajectory is calculated taking into account the current aircraft position and level (derived from the radar system 102 and updated every 6 seconds), the flight plan, and a range of other data including whether data and aircraft performance data (as discussed in greater detail below).

The trajectory calculated for each aircraft covers at least the next 18 minutes (the typical period of interest for a tactical air traffic controller) and preferably the next 20 minutes. The output of the trajectory prediction program 1082 is data defining a number of points through which the flight is predicted to pass, defined in three dimensions, with time and velocity information at each point. Associated with each point is an uncertainty region, as shown in FIG. 4.

Whilst the current position is known to some accuracy from the radar data, each future position is uncertain for several reasons. Firstly, the speed of the aircraft may vary (due, for example, to head or tail winds, or unknown or changing mass onboard) leading to a "along-track" uncertainty. Second, the lateral position ("across-track") position may vary, either because the pilot has altered course (some deviation from the planned course is generally permitted to pilots) or because of side winds. Finally, for aircraft in the climb or descent there is vertical uncertainty due to performance differences between aircraft of a similar type, pilot or airline operating preferences and the total mass of the aircraft. There is no vertical uncertainty associated with an aircraft in level flight (although there is an accepted tolerance of 200 feet around the cleared level within which the aircraft is allowed to operate and still be considered to be maintaining the level).

These uncertainties are magnified when the trajectory includes a change of heading or altitude. The tightness of a turn will depend upon aircraft performance and the magnitude of the course change, and the time of onset of the turn will depend upon the pilot (although the navigation standard defines how the aircraft should be operated when making course changes). Turns may be made in level flight or whilst climbing or descending. When climbing, the maximum rate of climb will depend upon aircraft performance and mass, as well as weather, and the chosen rate of climb and onset of climb will be chosen by the pilot (generally within standard operating constraints); similar considerations apply to descent.

Figure 4:
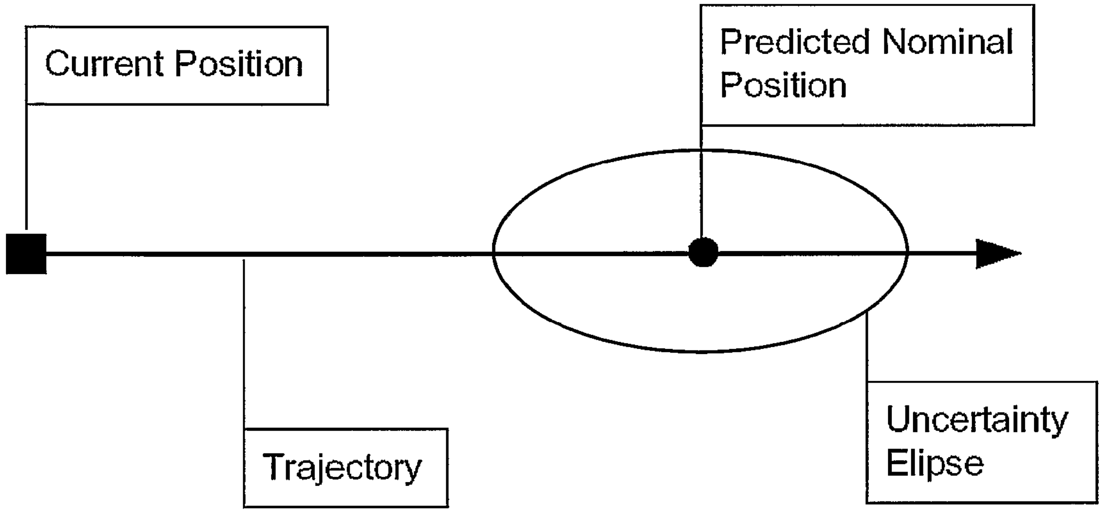
FIG. 4 is a diagram showing the position, trajectory and uncertainty therein of an aircraft according to the present embodiment.

Thus, as shown in FIG. 4, the trajectory prediction for each future point along the trajectory includes uncertainty data consisting of two-dimensional (along and across track) uncertainty data and altitude uncertainty data. This is shown as an ellipse characterised by two axes corresponding to along-track and across-track uncertainty. The boundary of the ellipse is, in this embodiment, intended to correspond to a 95% probability that the aircraft position will lie within. In general, the size of the uncertainty region increases the further forward in time is the prediction point, since the uncertainty at any given point along the trajectory is affected by the uncertainty at all previous points.

Figure 5:
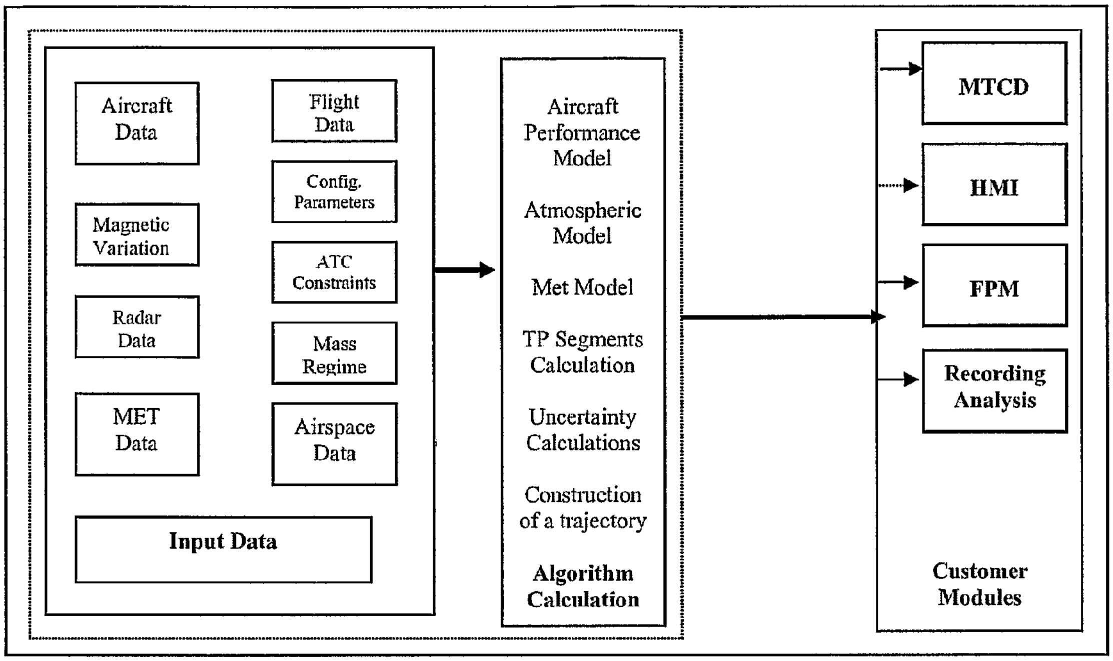
FIG. 5 is a diagram showing schematically the data and routines making up a trajectory prediction module forming part of FIG. 3.

FIG. 5 illustrates the data employed in the trajectory predictor 1082. The input data comprises aircraft data (e.g. performance data derived from the database 112)

Flight Data

The flight data includes:

ICAO aircraft type designator

Start time

Start fix

Cleared route—including origin and destination ICAO codes

Requested flight level

Flight plan status (pending, active, OLDI activation or tentative)

Airspace Data

The airspace data includes

A list of all fixes (including relevant fixes outside the UKFIR)

Definition of sector boundaries

The sector boundary would be used in processing to establish the last point by which a climb or descent needs to be started in order to reach the required level by the sector boundary. (This processing may not be required).

Radar Data

Radar data is available at 6 second sample rate. (This is the existing sampling rate for the en-route radar). The radar plot data provides:

Time

Aircraft position—system x, y coordinates

Mode C altitude (pressure altitude)

The following Radar track parameters are also available for each Radar plot:

Ground velocity—ground speed and track

Altitude (climb/descent) rate—derived from Mode C altitude.

Tactical Instruction Data

Tactical instruction data (i.e. instructions issued by the tactical controller to the aircraft pilot via the radio headset 320, such as an instructed course or altitude) is entered into the system directly via the keyboard 316 by the controller.

Each tactical instruction is time-tagged. The time will correspond to the time the tactical data was entered. The entry of the tactical data could be before or after the read-back by the pilot.

Aircraft Performance Data

The system uses an aircraft performance model to get the necessary aircraft performance data:

True air speed

Rate of climb/descent

Bank angle

The database 112 provides the aircraft performance model with the following data required to derive the aircraft performance data:

ICAO aircraft type

Sea level temperature (from MET data)

Mass model

Lateral/vertical manoeuvring state (derived from radar data)

Meteorological Data

The system requires forecast wind vector and temperature data. The wind and temperature data is obtained from forecast data.

The wind vector and temperature components are defined at each grid point.

Magnetic Variation

One of the factors affecting the accuracy of the trajectory predictor is the magnetic variation, that is the variation of magnetic North relative to True North at different positions.

Mass Data

The estimated aircraft mass at the appropriate phase of flight. The calculations performed comprise modelling the aircraft performance; modelling atmospheric conditions; modelling meteorological conditions; calculating the plurality of trajectory segments for each aircraft; calculating the uncertainty at each segments; and constructing the trajectory.

Figure 6:
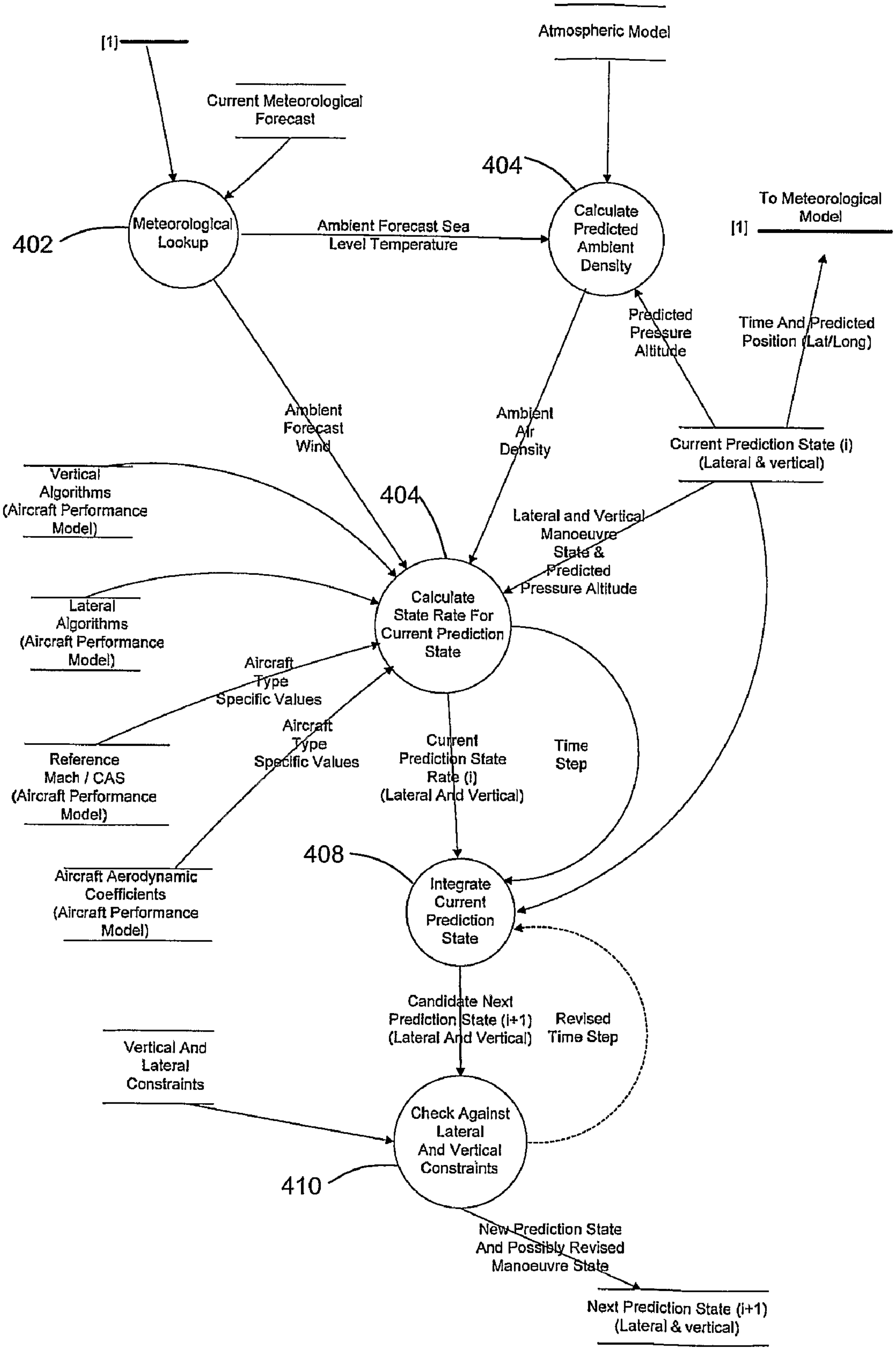
FIG. 6 is a process diagram showing the processes performed by the trajectory predictor of FIG. 5.

Referring to FIG. 6, the current meteorological forecast from the weather station 106 is used to perform a meteorological look up providing the forecast sea temperature and forecast wind over the forecast wind over the prediction period. The atmospheric model is used to calculate the predicted ambient air density over the prediction period.

From the aircraft performance model, the aircraft aerodynamic coefficients, and lateral and vertical performance, are used, together with the forecast wind and air density, and predicted manoeuvres to be undertaken by the aircraft, to calculate a future predicted position for future state (i) at future time (ti). The record for each calculated trajectory point contains the following fields:

time (the independent variable)

integration time step application at this TP point (independent variable)

position: latitude and longitude (derived from state)

position: Cartesian x-y (state)

along track distance from beginning of trajectory (derived from state)

pressure altitude (FL) (state)

true airspeed (TAS) (state)

aircraft true heading (state)

aircraft heading rate (state rate)

rate of climb/descent (ROCD) (state rate). A descent rate is negative.

aircraft ground-track velocity (derived from state)

lateral manoeuvring state {turning; fixed heading} and vertical manoeuvring state {climb; descent; cruise} (state—used to select state rate model)

point type: {way-point; TOC; BOC; TOD; BOD; . . . } (signifies a state transition for state rate model—used to trigger change in state rate model)

along track/across track UZ: error ellipse (define by 2×2 covariance matrix) (uncertainty in state)

altitude UZ: altitude upper and lower bounds (uncertainty in state).

The rate of change of position and each of the variables above is calculated, and from this, the state at future point (i+1) is calculated by moving forward in time to time ($t_{i+1}$), applying the rates of change calculated.

Thus, at every time of execution of the trajectory predictor 1082 (i.e. every 6 seconds), the server computer calculates, for each aircraft, a set of future trajectory points, starting with the known present position of the aircraft and predicting forward in time based on predicted rate of change of position and other variables to the next point; and so on iteratively for a 20 minute future window in time.

The output of the trajectory predictor is supplied to the medium term conflict detector 1084. It is also available for display on a human machine interface (HMI) as discussed in greater detail below; for recording and analysis if desired; and for flight plan monitoring. Flight plan monitoring consists in comparing the newly detected position of the aircraft with the previously predicted trajectory, to determine whether the aircraft is deviating from the predicted trajectory.

Medium Term Conflict Detector 1084

The operation of the medium term conflict detector 1084 will now be discussed. In general, the conflict detector 1084 is intended to detect the spatial interactions between pairs of aircraft. A given air traffic controller may need to be aware of 20 aircraft within the sector. Each aircraft may approach each other aircraft, leading to a high number of potential interactions. Only those interactions where the approach is likely to be close are of concern to the controller.

Figure 7:
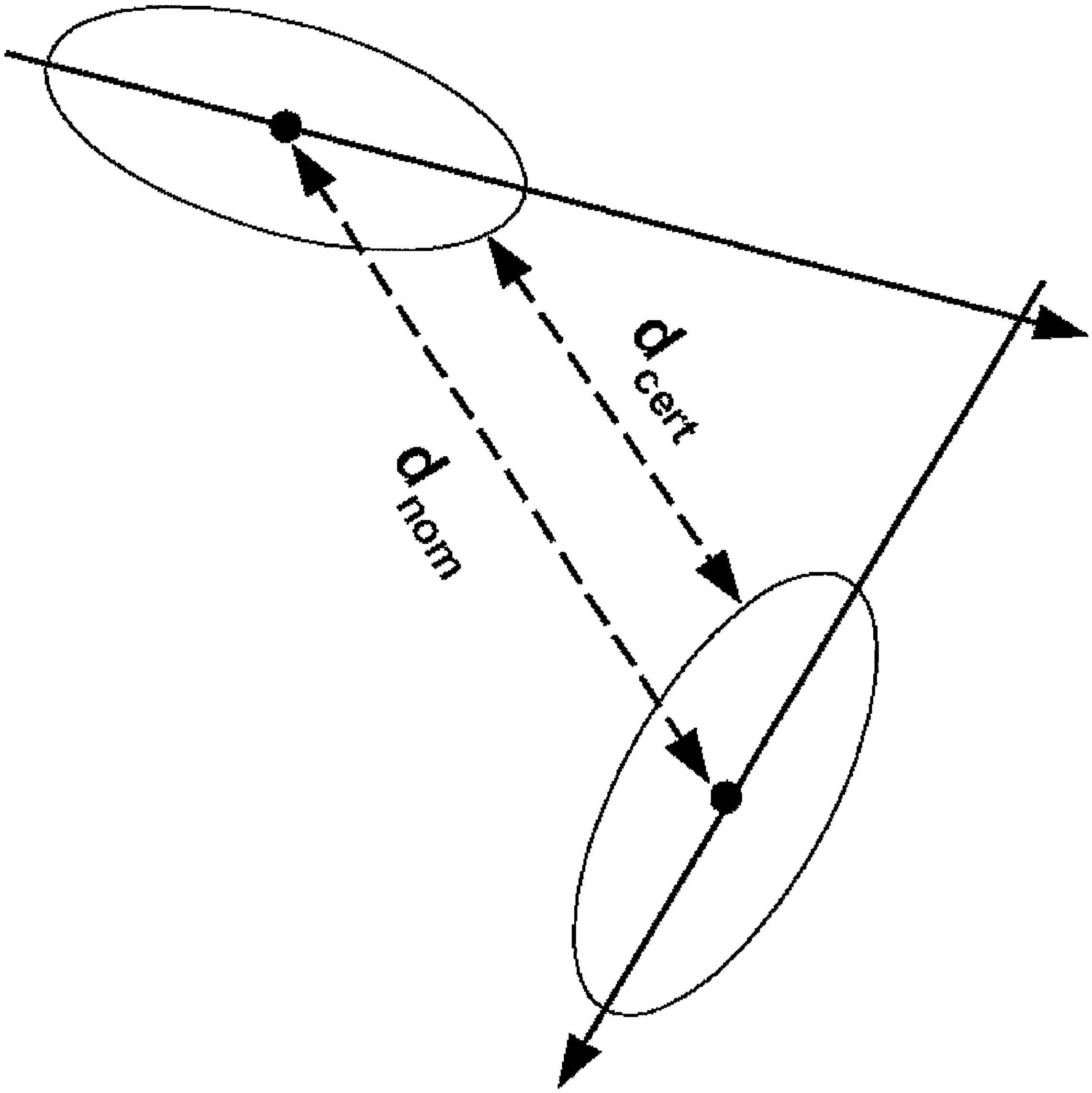
FIG. 7 is a diagram showing the geometry of an interaction between two aircraft in plan view.

Referring to FIG. 7, a snapshot of the predicted positions for two flights at a specified time in the future is shown. At this time, the distance between the nominal predicted positions, dnom, is inevitably greater than the minimum distance between the uncertainty envelopes of the two aircraft. In FIG. 7, which is not to scale, the envelopes shown represent a 95% confidence level that the aircraft's future position at the time concerned will lie within the shaded ellipse. The elliptical shape is due to the multivariate statistical combination of the along track and across track errors, and would in general be different for the two aircraft (rather than similar as shown in the diagram). Given the calculated uncertainty, it is therefore important that the distance between the two regions of uncertainty dcert, is calculated.

FIG. 6 shows the two trajectories of the aircraft converging in a plan view. They could, however, be diverging or separated in altitude; the fact that the trajectories appear in plan view to cross does not indicate whether the interaction between the aircraft is problematic, because it does not indicate whether both aircraft arrive simultaneously at the intersection.

The medium term conflict detector assesses the interaction between each pair of aircraft and calculates a data set representing each such interaction, including the first point in time at which they may (taking into account uncertainty) approach each other too closely; the time of closest approach; and the time in which they separate sufficiently from each other after the interaction.

The medium term conflict detector 1084 receives the trajectory data for each aircraft from the trajectory predictor 1082. As discussed above, each trajectory consists of a plurality of position points, the data at each point including time position (X, Y), altitude, ground speed, ground track, vertical speed, uncertainty co-variance (i.e. an along-track and an across-track uncertainty measurement) and altitude uncertainty. The medium term conflict detector 104 can interpolate the corresponding data values at intervening points, where necessary, as follows:

$$\alpha(t) = \frac{(t - t_i)}{t_{i+1} - t_1}$$

$$x(t) = (1 - \alpha(t))x(t_i) + \alpha(t)x(t_{i+1})$$

To deal with vertical uncertainty, the altitude dimension is divided into flight level segments, and where the uncertainty data from the trajectory predictor 1082 is within 200 feet of a given flight level, then that flight level is considered to be "occupied" by the aircraft, in addition to the flight level within which its nominal altitude lies.

Figure 8:
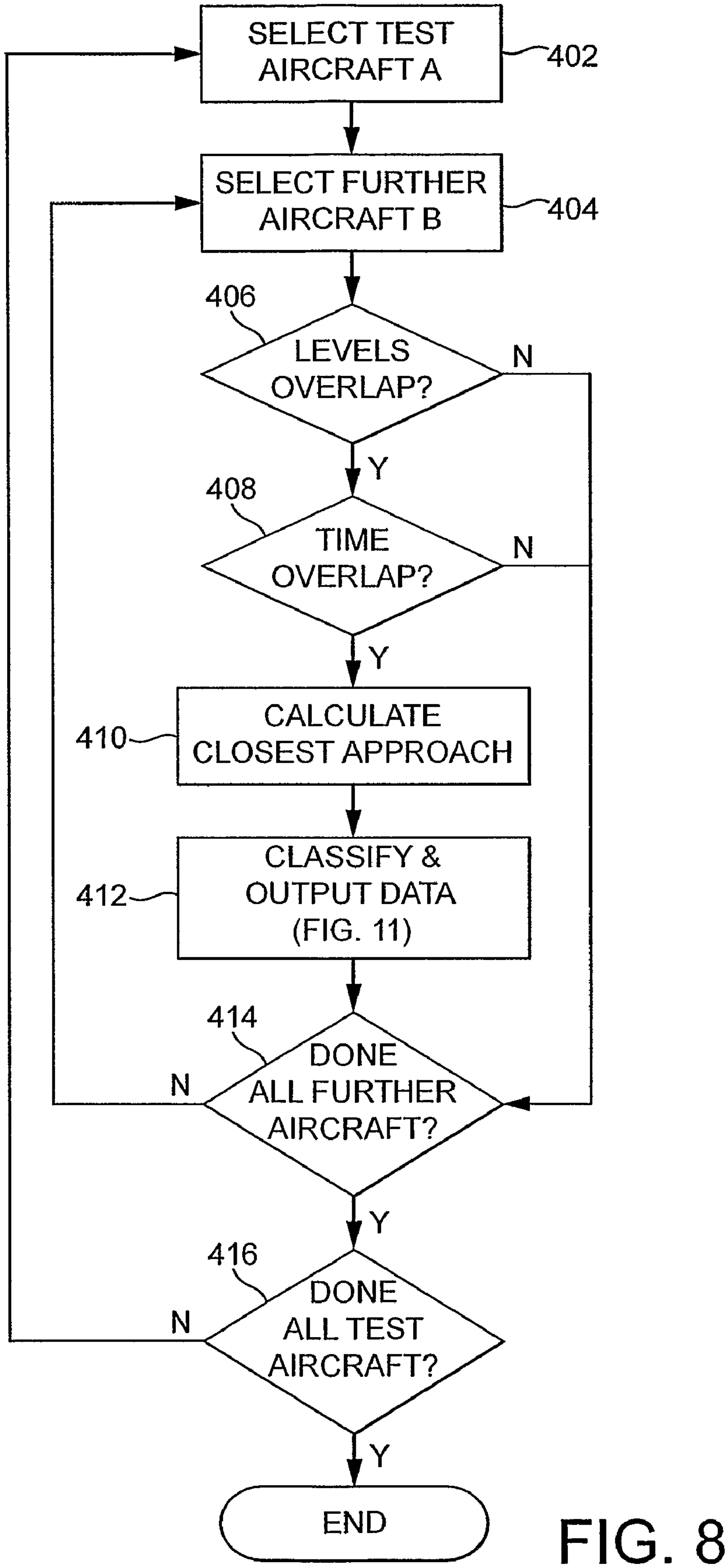
FIG. 8 is a flow diagram showing the process of conflict detection performed by a medium term conflict detector according to the present embodiment.

In more detail, referring to FIG. 8, at each time of operation (e.g. after obtaining a new set of data from the TP 1082, thus at least once every 6 seconds) the MTCD 1084 selects a first aircraft A (step 402) and then selects a further aircraft B1 (step 404).

In step 406, the flight levels occupied by the pair of aircraft along their trajectories are compared. If there is no overlap between the flight levels, the MTCD proceeds to step 414 below, to select the next aircraft.

If the pair of aircraft occupy, at some point along their trajectories, the same level, then in step 408 the MTCD 1084 determines whether they occupy the same level(s) at the same time(s) and if not, control proceeds to step 414. Otherwise (i.e. where the aircraft may show the same flight level concurrently at some future time along their trajectories) in step 410, using the trajectory data for the aircraft A, B, the MTCD 1084 finds the point at which the two trajectories most closely approach (in X, Y co-ordinates).

Having located this point, on the trajectory of each of the aircraft, the MTCD 1084 calculates (step 412) a plurality of other data which characterise or classify the interaction. The relative headings between the pair of aircraft at the closest approach point are also calculated from their trajectories, and the interactions are classified into "head on" (where the relative heading lies between 135-225°); "following" (where the relative headings lie between plus/minus 45°); and "crossing" (where the relative headings lies at 45-135° or 225-270°). Other angular bands are of course possible.

After classification, control proceeds to step 414, where, until all further aircraft have been considered, control proceeds back to step 404 to select the next aircraft (or, after all have been considered, in step 416 if further test aircraft remain control proceeds back to step 402 to select the next test aircraft).

Figure 9:
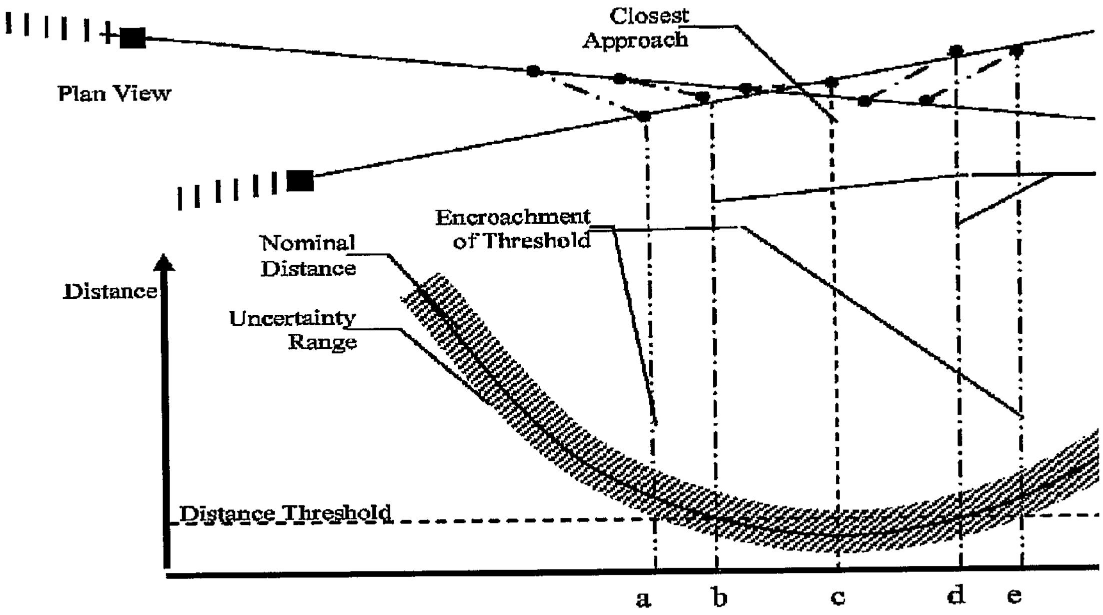
FIG. 9 is a graph is distance over time showing the variation in distance between two flights corresponding to those of FIG. 7.
Figure 10:
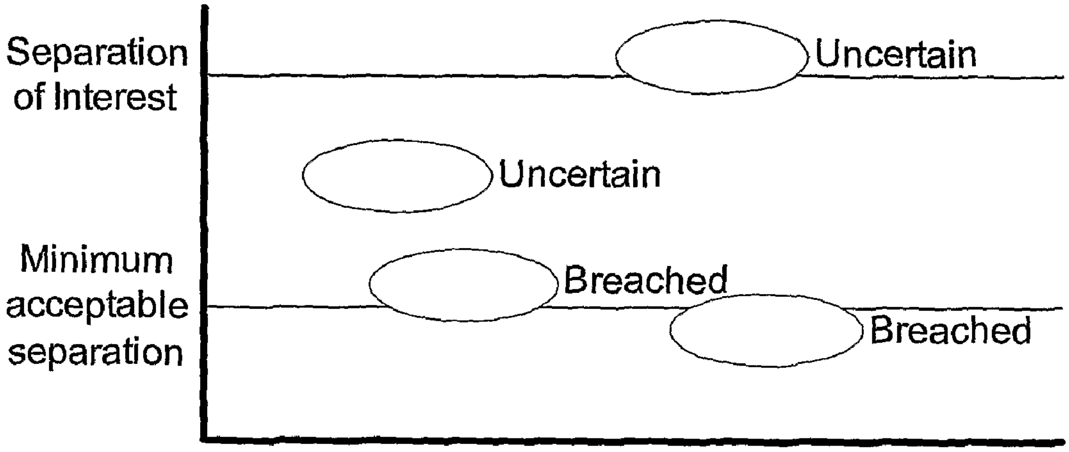
FIG. 10 is a graph of separation distance against time showing three classes of interaction.

Classification makes use of two distance thresholds; a minimum radar separation threshold (generally 5 nautical miles although it could be 10 nautical miles in areas towards the extremes of radar cover), and an upper "of interest" threshold (typically set at 20 nautical miles, which is the minimum separation which a planning controller can apply to aircraft without first consulting a tactical controller). The data calculated for each interaction (i.e. time around a point of closest approach) is shown in FIG. 9. The points at which the distance between the uncertainty regions of the two aircraft Dcert (shown in FIG. 7) first falls below the relevant threshold is shown in FIG. 9 as the "start of encroachment" point, and the point at which, after the interaction, Dcert first exceeds the separation threshold is the end of encroachment point. The point at which the calculated nominal distance Dnom between the predicted future positions of the two aircraft first falls beneath the relevant threshold is shown as the intrusion of threshold point, and likewise the point at which the nominal distance Dnom first exceeds the threshold again is the end of intrusion point. The closest approach point is that at which the nominal distance Dnom is minimum. The minimum reported distance is the distance between the uncertainty zones at the time of nominal closest approach (i.e. Dcert at the time of minimum Dnom).

Figure 11:
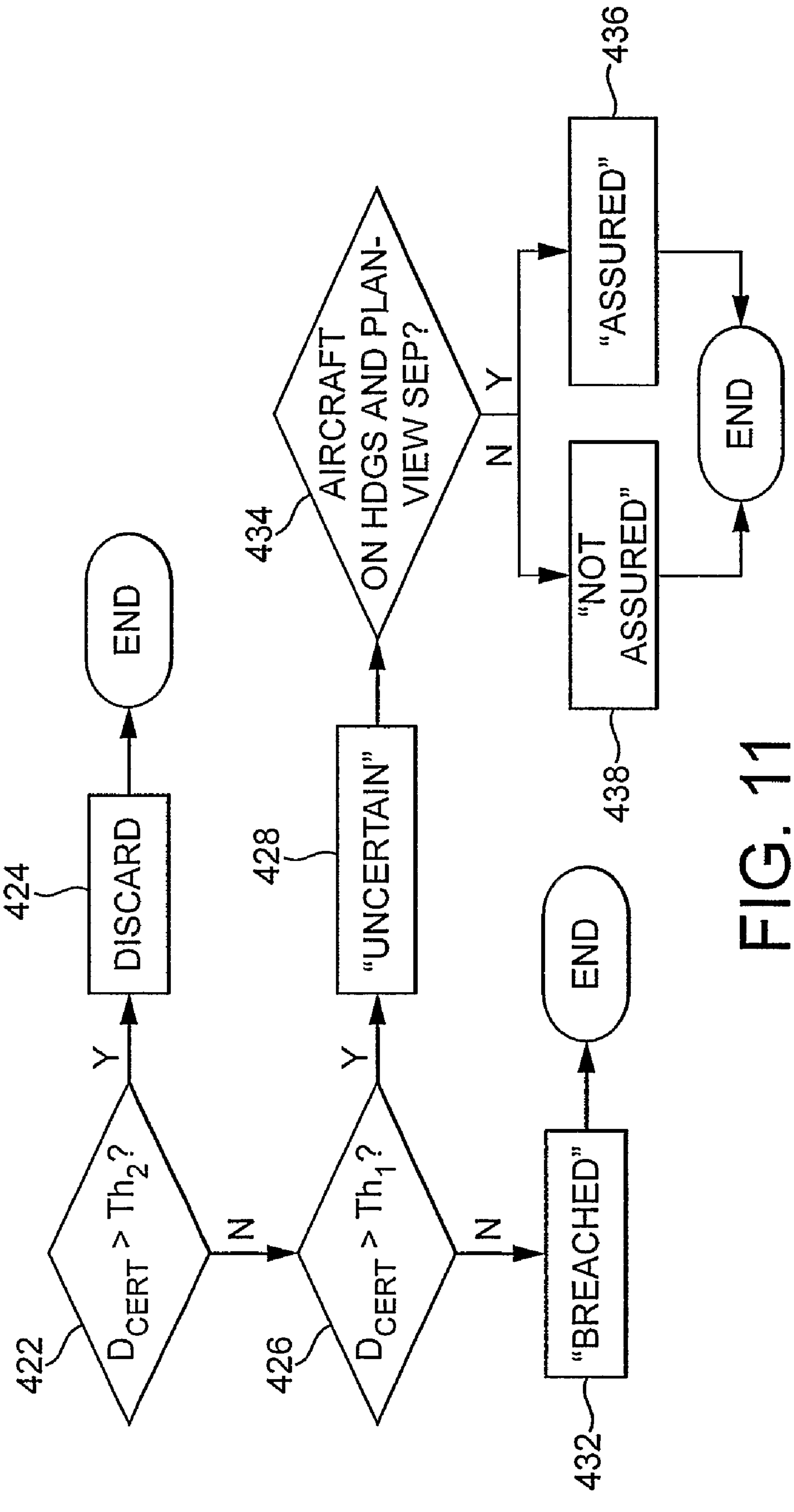
FIG. 11 is a flow diagram showing the process of classification of interactions performed by the medium term conflict detector forming part of FIG. 8.

Referring to FIG. 11, the classification process will now be described in greater detail. The classification process follows two stages; initial classification based upon predicted minimum closest approach distance and secondary classification based upon the navigation states (route or heading instructions) under which the aircraft involved are operating.

If (step 422), at the point of closest approach, neither Dcert nor Dnom is less than the "of interest" distance threshold (i.e. 20 nautical miles), the interaction is discarded (step 424).

Otherwise (step 426), if Dcert is less than the "of interest" distance threshold but greater than the minimum separation threshold (i.e. 5 nautical miles) then the interaction is classified as being "uncertain" (step 428) and a corresponding "uncertain" interaction record is stored which, as discussed below, will be post-processed.

Where (step 426) the distance Dcert at closest approach is less that the minimum acceptable separation (i.e. 5 nautical miles), the interaction is classified by the MTCD 1084 as being a "breached" interaction (step 432).

For each interaction in the "uncertain" class, the MTCD 1084 determines (step 434) whether the aircraft involved are on their own navigation or on a heading. At this point, it may be convenient to explain the difference between the two possibilities. Aircraft on their own navigation (i.e. following their filed route, or an amended route issued by the controller) are required to adhere to their flight path but may deviate by up to 5 nautical miles from their route centre line (as defined by the RNP-5 navigation standard). However, it is possible for the flight controller to issue instructions to the pilot, indicating a specific heading to fly. Where this is done, the pilot will readily be able to use the aircraft compass to stick closely to the instructed heading, thus effectively reducing the across-track error close to zero.

According to the present embodiment, when a controller issues a heading instruction to the pilot through the headset 320, and receives in response an acknowledgement from the pilot, the controller enters an "on heading" instruction through the keyboard 316, in response to which the terminal 318 signals via the network 310 to the host 108 that the aircraft concerned is on a heading, and "on heading" instruction data is stored in relation to that aircraft. The "on heading" flag is then past to the MTCD 1084.

According to the present embodiment, when the MTCD examines an uncertain interaction as described above in step 434, it determines whether or not the aircraft is on a heading. Where either of the aircraft is not on a heading, the interaction is classified as "not assured" (step 438). On the other hand, when both aircraft are on a heading, the MTCD applies different criteria. In the simplest case, where both aircraft are on a heading, the MTCD 1084 classifies the interaction as "assured" if there is also a minimum "plan-view" separation of 5 nautical miles (to ensure that actual horizontal separation between the aircraft is predicted to be ensured regardless of vertical performance).

Alternatively, the MTCD may determine whether the minimum distance Dcert exceeds a lower separation threshold or reduce the across-track error to zero, and then re-test Multiple Trajectories The operation of the trajectory predictor 1082 and medium term conflict detector 1084 has been described with reference to the predicted trajectories of pairs of aircraft. It is possible that a given aircraft may be associated with more than one type of trajectory. For example, before the aircraft is under control of the tactical controller, it may have an associated trajectory (as briefly discussed above), based on its flight plan and designated sector entry level.

Secondly, as mentioned above, where an aircraft is detected, via radar, to be on a trajectory which is diverging from the previously predicted trajectory, the trajectory predictor 1082 is preferably arranged to calculate a "deviation trajectory" by extrapolating the newly-detected heading of the aircraft, as well as maintaining the previously stored trajectory. In this case, both the previously stored trajectory and the newly calculated deviation trajectory are supplied to the MTCD 1084 and used to detect conflicts.

Finally, in preferred embodiments, the controller can input data defining a tentative trajectory (to test the effect of routing an aircraft along the tentative trajectory). The MTCD is arranged to receive, in addition to the calculated trajectory and any deviation trajectory, an tentative trajectory and to calculate the interactions which would occur if that trajectory were adopted.

Human Machine Interface

Figure 12:
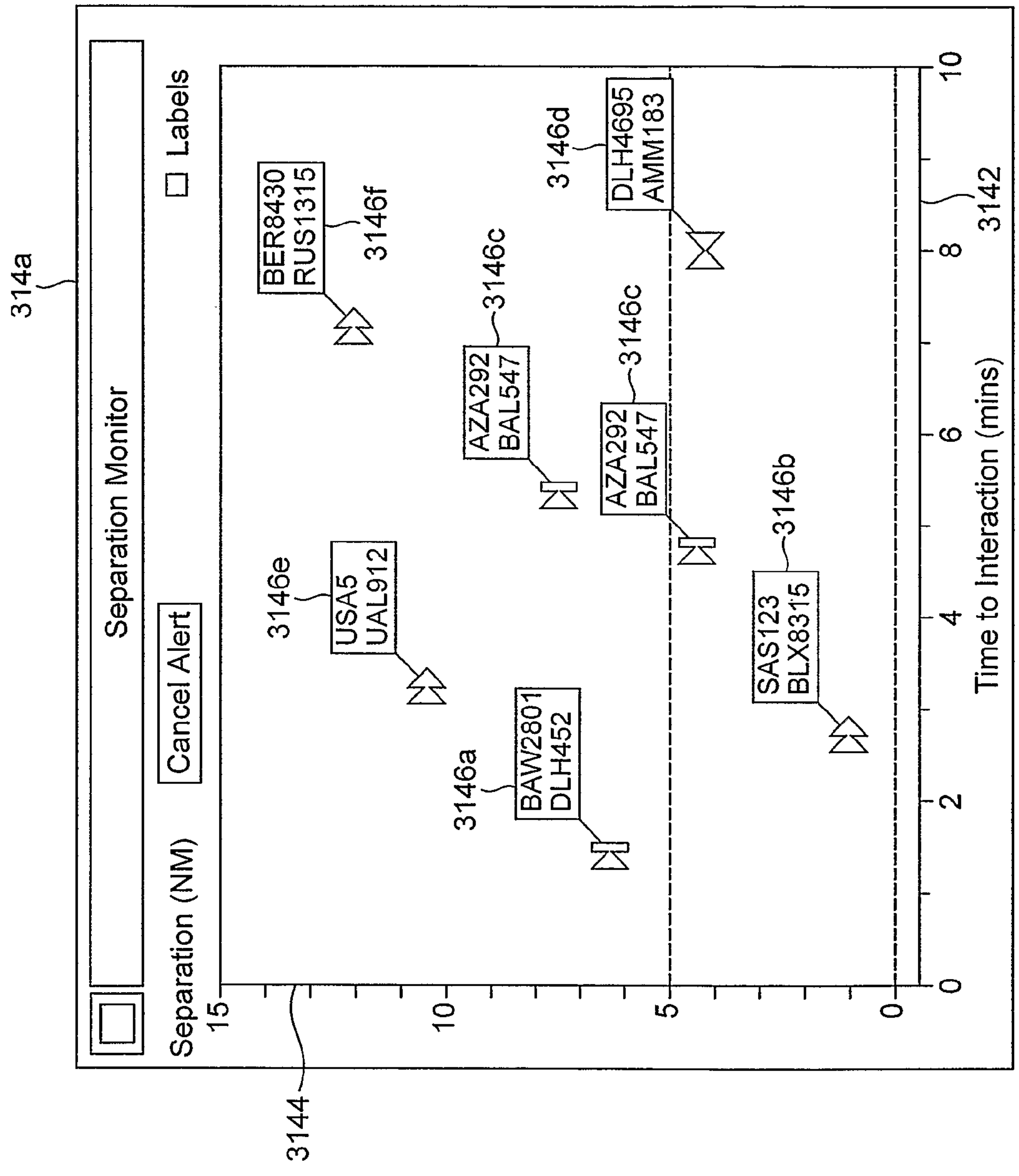
FIG. 12 shows a screen display indicating a plot of separation against time, and corresponding to that of FIG. 10, displayed in an embodiment of the workstation of FIG. 2.

Some of the displays available on the screen 314 will now be discussed. FIG. 12 shows a Separation Monitor display comprising a horizontal axis 3142, displaying time (in minutes) to an interaction, and a vertical axis 3144 for indicating separation (in nautical miles) between paired aircraft. In this embodiment, the separation indicated is the minimum separation; that is, the minimum guaranteed separation (taking account of uncertainty) at the time of closest approach. However, in this embodiment, the time to interaction indicated is the time to the point of loss of separation (i.e. the beginning of the interaction) for breached interactions, or the time of nominal closest approach for assured or not-assured interactions.

A plurality of symbols are shown (labelled 3146*a*-3146*g*) each representing a respective interaction between pair of aircraft. The meaning of these will now be described, in turn. Each symbol consists of a colour and a shape, at a position on the graph representing a separation at a future time. It has an associated label comprising a box including the identification codes of the two flights. The shape indicates the classification of the type of interaction geometry (catching up, crossing or head-on).

Symbol 3146*b* is at a point indicating a minimum separation of 1 nautical mile, with a loss of 5 mile separation predicted to commence in 2.5 minutes. The shape in this instance comprises two arrows pointing in the same direction. That indicates a catching up interaction where one aircraft is overhauling another, (i.e. they are flying on roughly parallel or slowly converging headings) as discussed above. The colour of the symbol is red, which indicates a breached interaction (as defined above). The label indicates flight numbers SAS 123 and BLX 8315. The controller can therefore see that a breached interaction will occur beginning in 2.5 minutes time involving that pair of aircraft, with one overhauling the other.

3146*a* has a symbol consisting of an arrow meeting a bar. This indicates that the interaction is a crossing-type interaction (in other words, one aircraft is approaching from the side of the other). The interaction shows a minimum separation (which in this embodiment is the minimum distance between uncertain regions Dcert) of around 6 nautical miles in around 1.5 minutes. This corresponds to an "assured" classification, and it is coloured green. Similarly, 3146*f* denotes another "assured" interaction and is coloured green; the interaction is a following-type interaction like that of 2146*b*.

3146*e* and 3146*g* are both yellow, indicating that they are classified as "not assured" interactions (in other words, the aircraft in each case are either following their own navigation, or have been instructed to follow headings that do not provide 5 miles horizontal separation), and their minimum separation Dcert are shown, in each case above 5 nautical miles. 3146*e* represents a catch-up interaction and 3146*g* a crossing interaction.

3146*c* is a crossing interaction, shown in white, indicating a "deviation interaction", that is an interaction between two aircraft at least one of which has been detected (by the flight path monitor) as deviating from its predicted trajectory either laterally or vertically. The deviation interaction is identified by the MTCD 1084 probing a "deviation trajectory" which is generated by the TP 1082 and extrapolates the observed behaviour of the aircraft which has been detected to have deviated from its clearance as discussed above. The deviation interaction, although displayed to the controller in white (so as to clearly differentiate it from the other interactions) is classified by MTCD 1084 as either breached or not assured using the previously described logic (a deviation interaction can not, by definition, be classified as assured).

The flight controller is now in a position to determine, from the separation monitor, not only those pair of aircraft giving rise to concern, but also what he should do about it.

The interactions which are shown as "breached" will require him to change the vertical or navigation clearance of one or both aircraft before the elapse of the time of interaction, or a breach of the minimum separation of 5 nautical miles is predicted to occur.

The aircraft shown as "assured" require no action from him. Those shown as "not assured" require him to take action, and indicate that by putting both aircraft on a heading, he can change their status to "assured" and then be sure that the minimum separation of 5 nautical miles will not be breached. On the controller issuing such an instruction, the next time the MTCD 1084 performs a classification cycle (i.e. in less than 6 seconds) at step 434 the interaction will be classified as "assured" and the symbol colour will change, enabling the controller to have no further concerns over the interaction.

In this way, controllers are enabled to make decisions rapidly. It will be appreciated that re-routing an aircraft may require some thought if it is to be kept clear of all others, and the ability to discriminate those which require re-routing from those which can be locked on a heading is therefore advantageous.

Furthermore, it is advantageous to indicate the interaction geometry, to assist the controller both in building a mental picture of the aircraft he is controlling and what to do about it. He will appreciate that aircraft approaching head on will tend to approach each other more rapidly, so that the duration of the interaction is shorter from the initial loss of separation to the closest approach, and such an interaction therefore needs more urgent handling. Further, in resolving such interactions, he can see how to instruct the pilots so as to separate the flights; for example, in the case of a head-to-head interaction he can instruct both aircraft to turn left, whereas in the case of a catch-up interaction he can tell one to go left and one to go right.

Figure 13:
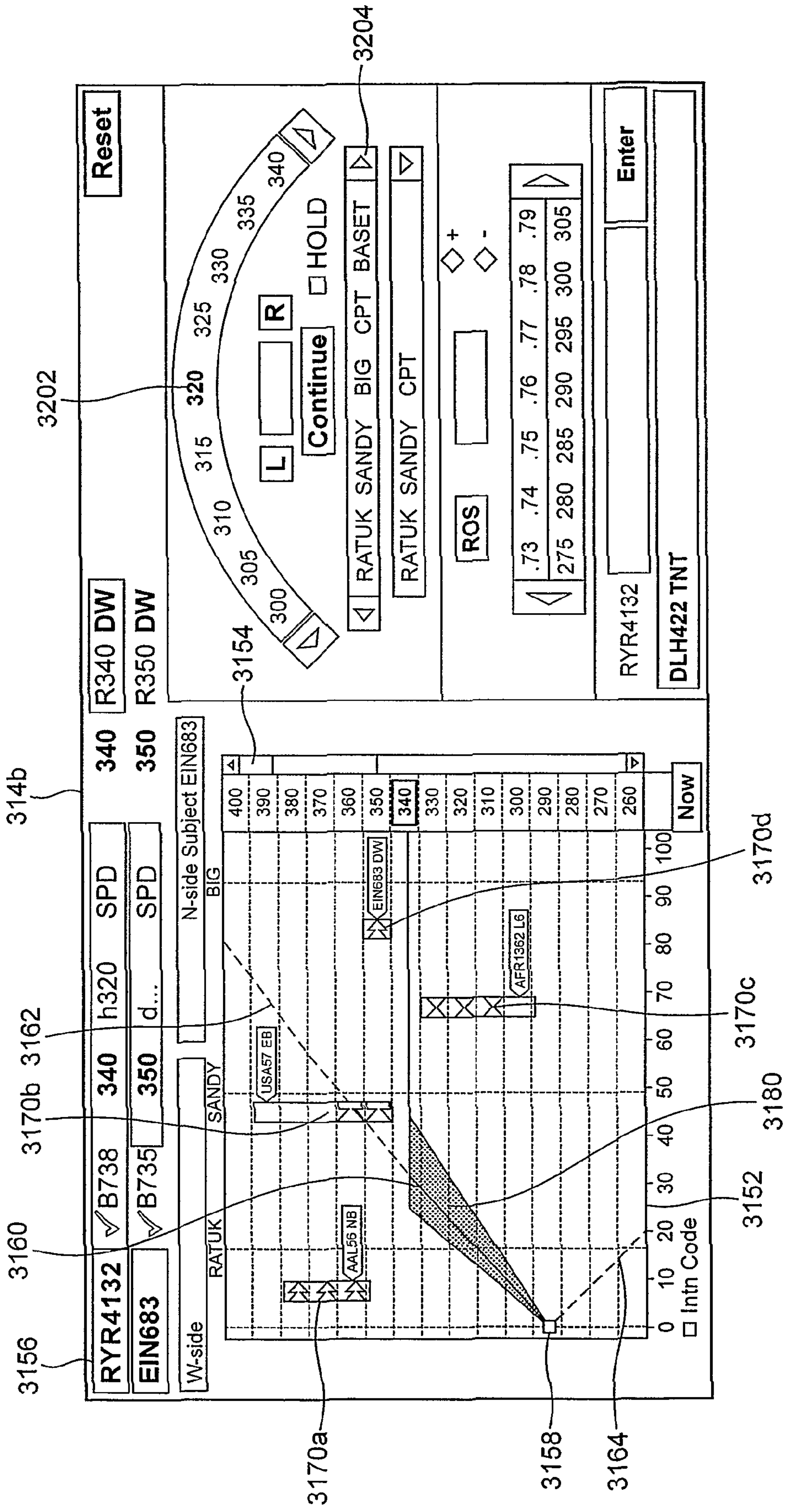
FIG. 13 is a user interface showing a display of altitude against along track distance for a selected aircraft and indicating potential interactions with other aircraft, and including a tactical instruction (clearance) entry portion.

Referring to FIG. 13, a second display is shown allowing the controller to plan for vertical risks. The second display provides a horizontal axis 3152 showing distance (although time could alternatively be used) and a vertical axis 3154 showing altitude.

In the upper left corner of the display is an indicator text box 3156 indicating the identity of the flight to which the display relates. A point 3158 located at zero along the distance axis show the present altitude of the flight indicated in the text box 3156, and the line 3160 indicates the predicted track of the flight concerned. This is normally the currently predicted track of the aircraft, but in the preferred embodiment the controller can additionally enter a tentative or "what-if" trajectory, to test the effect before issuing instructions to the pilot.

In this case, it will be seen that the track 3160 indicates a climb to a flight level of 340 (i.e. a pressure altitude of 320*100=approximately 34,000 feet depending on local atmospheric pressure) at a distance of 30 nautical miles ahead of the subject aircraft along its trajectory, followed by level flight at that flight level. An extension line 3162 extends the climb portion of the track 3160, so as to indicate the effect of the aircraft continuing to climb rather than entering level flight, and a track 3164 indicates the nominal descent rate of which the aircraft is capable.

Also shown are four symbols 3170*a*, 31470*b*, 31470*c*, 31470*d* indicating other aircraft. As before, each symbol has a shape and a colour, and the shapes and colours have the same meaning as in FIG. 12. Taking the symbols in turn, the symbol at 3170*d* consists of a symbol, accompanied by a text box indicating the name of the flight concerned. The position of the symbol indicates that the flight will be approached after around 85 nautical miles. Thus, 3170*d* shows two arrows travelling in the same direction and therefore indicates that one flight is overtaking the other. 3170*d* is located at flight level 350 (approximately 35,000 feet), and is coloured yellow to indicate that it is a not assured interaction. Thus, the controller can see that the interaction between the two flights can be made assured by locking them on a heading.

3170*b* shows a symbol coloured green to indicate that it is an "assured" interaction in other words, regardless of the altitudes, the headings are such that the flights will be well separated by at least the required minimum distance and no action by the controller is necessary.

3170*c* shows the interaction with an aircraft. The aircraft is shown in red at flight level 330, indicating that the interaction is breached at that level. The symbol indicates that the interaction is a head on interaction. The symbol is surrounded by a bounding box extending down to flight level 300. Within that box, symbols are also shown, in yellow, at flight levels 310 and 320, indicated that there would be "not assured" interactions at those levels. Surrounding the ascending portion of the track 3160 is an uncertainty zone 3180. This indicates, above and to the left, the maximum possible speed at which the aircraft might climb and, below and to the right, the minimum predicted climb rate.

The interpretation made by the controller of the interaction denoted by the symbol 3170*c* is as follows. The aircraft represented by the symbol 3170*c* is expected to be at flight level 330 at the time of interaction. It is currently at flight level 300, and has been cleared to ascend to flight level 330. The bounding box forming part of the symbol 3170*c* (and the other symbols) therefore shows all the cleared levels through which that aircraft is currently cleared to ascend or descend to in the medium term. The reason is that, whilst the trajectory of the aircraft is expected to climb to 330 by the time of the interaction, it might stay at this current altitude, or climb much slower. Thus, displaying all altitudes through which it cleared to fly over the medium term represents an additional measure of safety for the controller since only under exceptional circumstances will an aircraft breached its cleared levels. The controller is able to maintain "technical separation" between the flights.

The controller can also determine that the aircraft denoted by the track 3160 should have climbed past the aircraft denoted by the symbol at 3170*c* to an altitude of 340 by the time it has traveled 50 nautical miles, even if it climbs at its minimum predicted climb rate. Aircraft normally climb significantly faster than the minimum predicted rate, so as to maximise the intervals of level flight. However, should the pilot chose to climb at a slower rate, he might interact with the flight shown by the symbol at 3170*c*.

Finally, the flight indicated by the symbol 3170*a* is shown in red, but the region of uncertainty shown as 3180 indicates that the aircraft cannot climb fast enough to interact with it. However, if it is desired to maintain "technical separation" (i.e. to issue a fail-safe clearance), the controller cannot climb the subject aircraft above flight level 350 until 3170*a* has vacated flight level 360 (as track 3170*a* might, unexpectedly, reduce its climb rate).

The controller can therefore see that the provided the aircraft follows the track 3160, it will avoid interactions with all other aircraft, but if it continues to climb beyond the altitude of 340 it would be necessary to take action (by locking aircraft on headings) to avoid the aircraft shown by symbol 3170*d*, and if the aircraft climbs too slowly it will interact with the aircraft denoted by symbol 3170*c*.

To the right of the display is provided a heading control consisting of an arcuate heading display 3202, centred on the current heading of the aircraft being controlled. By clicking on the arrows to either side of the arcuate display, or by directly typing in a new heading using the keyboard, the controller can enter a new tentative trajectory which, as discussed above, will be predicted by the trajectory predictor and the corresponding interactions will be recalculated by the medium term conflict detector 1084.

Alternatively, one of a plurality of waypoints can be selected by the controller to indicate that the selected aircraft which fly towards the waypoint, from a waypoint display 3204. The visual representation of the type of interaction (e.g. head on, lateral or following) is of assistance to the controller in determining a suitable input trajectory to reduce the severity of the interaction. If the operator finds a new trajectory which eliminates "breached" and "not assured" transactions, he then instructs the pilot through the headset 320, and enters the new trajectory (by selecting the "enter" button on the screen 314*b*) and the new trajectory is henceforth employed by the trajectory predictor 1082 for that aircraft.

Finally, though not shown here, a lateral display is conveniently provided in which a simplified plan view of the aircraft tracks is given superimposed onto the radar situation display, with arrows indicating the directions of flight and predicted aircraft positions at closest approach.

Other Variants And Embodiments

Although embodiments of the invention have been described above, it will be clear that many other modifications and variations could be employed without departing from the invention.

Whilst one host computer has been described as providing the trajectory prediction and conflict detection functions for a sector of airspace, the same functions could be distributed over multiple computers or, alternatively, all calculations for multiple sectors could be performed at a single computer. However, it is found particularly convenient to provide one (or more) server for each sector, since it is then only necessary to calculate the limited number of interactions between aircraft in that sector (it being appreciated that the number of interactions rises as the square of the number of aircraft).

Whilst the terminals are described as performing the human machine interface and receiving and transmitting data to the host computer, "dumb" terminals could be provided (or calculation being performed at the host). Many other modifications will be apparent to the skilled person.

The invention claimed is:

1. An air traffic control system, for use by a controller controlling a plurality of aircraft, comprising:
- a processor,
- an input device,
- a display device,
- trajectory prediction means for calculating a predicted altitude trajectory for each of said plurality of aircraft, for inputting aircraft detected position data, and for recalculating said predicted altitude trajectory for each of said plurality of aircraft based on said position data,
- means for inputting and storing instruction data corresponding to level clearance instructions issued by said controller to one or more of said plurality of other aircraft, and
- means for causing a display on said display, said display comprising a graph indicating the predicted altitude trajectory for a selected aircraft of the plurality of aircraft, and indicating symbols, one for each of a plurality of other aircraft of the plurality of aircraft,
- said indicating symbols for each of the plurality of other aircraft indicating both the current level and the one or more levels for which said level clearance instructions have been input.

2. An air traffic control system according to claim 1, further comprising conflict detection means for detecting, based on said predicted trajectories, future circumstances under which said selected aircraft and each of said plurality of other aircraft would violate predetermined proximity tests, and in that said symbols indicate said future circumstances.

3. A system according to claim 2, further comprising input means for permitting input of a tentative trajectory for one or more of said plurality of aircraft, in which said display means is arranged to generate said display based on said tentative trajectory in addition to or instead of said predicted trajectory.

4. An air traffic control system according to claim 1, further comprising input means for permitting input of a tentative trajectory for one or more of said plurality of aircraft, in which said display means is arranged to generate said display based on said tentative trajectory in addition to or instead of said predicted trajectory.

5. A method for operating a computerized air traffic control system, for use by a controller controlling a plurality of aircraft, comprising:
- calculating a predicted altitude trajectory for each of said plurality of aircraft;
- receiving aircraft position data;
- recalculating said predicted altitude trajectory for each of said plurality of aircraft based on said position data;
- receiving and storing instruction data corresponding to level clearance instructions issued by said controller to one or more of said plurality of other aircraft; and
- displaying on a monitor a graph indicating the predicted altitude trajectory for a selected aircraft of the plurality of aircraft and indicating symbols, one for each of a plurality of other aircraft of the plurality of aircraft;
- wherein said indicating symbols for each of the plurality of other aircraft indicate both the current level and the levels for which said level clearance instructions have been input.

6. The method according to claim 5, further comprising
- detecting, based on said predicted trajectories, future circumstances under which said selected aircraft and each of said plurality of other aircraft would violate predetermined proximity tests; and wherein said symbols indicate said future circumstances.

7. The method according to claim 6, further comprising
- receiving a tentative trajectory for one or more of said plurality of aircraft; and
- displaying on said monitor an indication of said tentative trajectory.

8. The method according to claim 5, further comprising
- receiving a tentative trajectory for one or more of said plurality of aircraft; and
- displaying on said monitor an indication of said tentative trajectory.

9. An air traffic control system comprising:
- a display device;
- one or more computers in communication with said display device and configured to
- calculate a predicted altitude trajectory for each of a plurality of aircraft,
- receive aircraft position data,
- recalculate said predicted altitude trajectory for each of said plurality of aircraft based on said position data,
- receive instruction data corresponding to level clearance instructions issued by said controller to one or more of said plurality of aircraft,
- cause a display on said display device, said display comprising
  - a graphical indication of the predicted altitude trajectory for a selected aircraft of the plurality of aircraft, and
- symbols, one for each of a plurality of other aircraft of the plurality of aircraft, said symbols indicating for its associated aircraft, the current level and the one or more levels for which said level clearance instructions have been received.

10. The air traffic control system according to claim 9, wherein said one or more computers is further configured to determine, based on said predicted trajectories, future violations of predetermined proximity tests by said selected aircraft and each of said plurality of other aircraft, and causing said symbols to indicate said future violations.

11. The air traffic control system according to claim 10, wherein said one or more computers is further configured to receive a tentative trajectory for one or more of said plurality of aircraft, and cause a display on said display device of a graphical indication of said tentative trajectory.

12. The air traffic control system according to claim 9, wherein said one or more computers is further configured to receive a tentative trajectory for one or more of said plurality of aircraft, and causing a display on said display device an indication of said tentative trajectory.

* * * * *